Figures 1, 2:
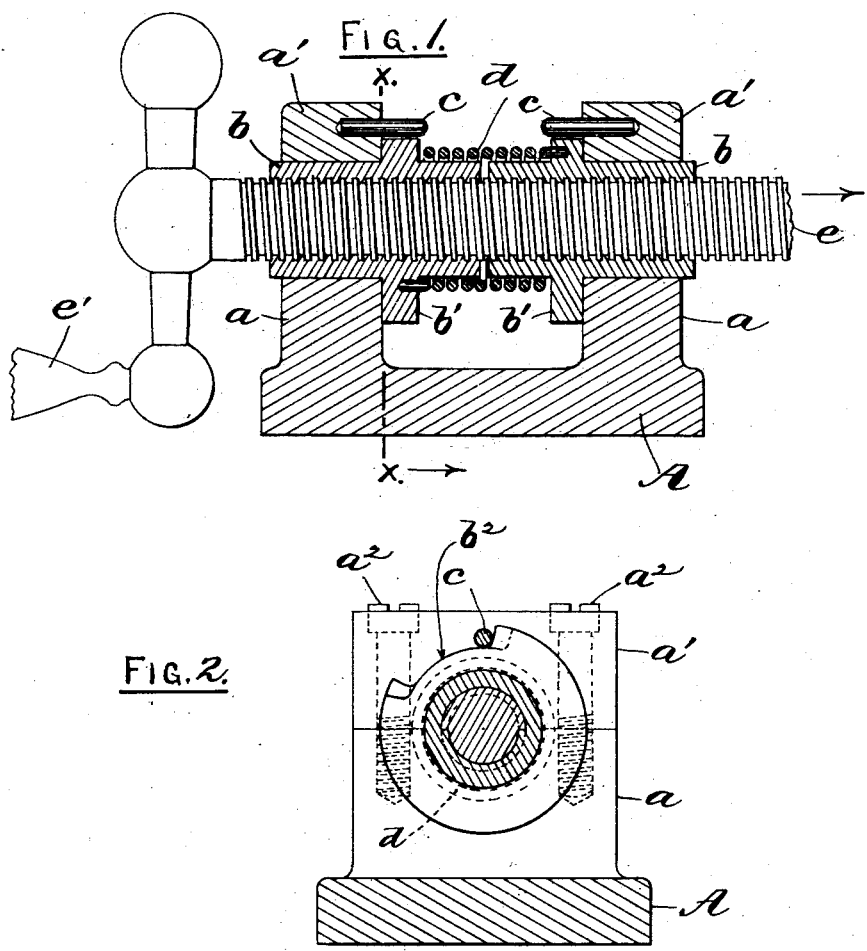

(No Model.) 2 Sheets—Sheet 1.

J. W. BOYNTON.
MECHANISM FOR TAKING UP LOST MOTION.

No. 525,780. Patented Sept. 11, 1894.

WITNESSES: INVENTOR
S. J. Murphy. John W. Boynton
John Henshaw. BY
Wilmarth H. Thurston
ATTORNEY (No Model.)
2 Sheets—Sheet 2.
J. W. BOYNTON.
MECHANISM FOR TAKING UP LOST MOTION.
No. 525,780.
Patented Sept. 11, 1894.
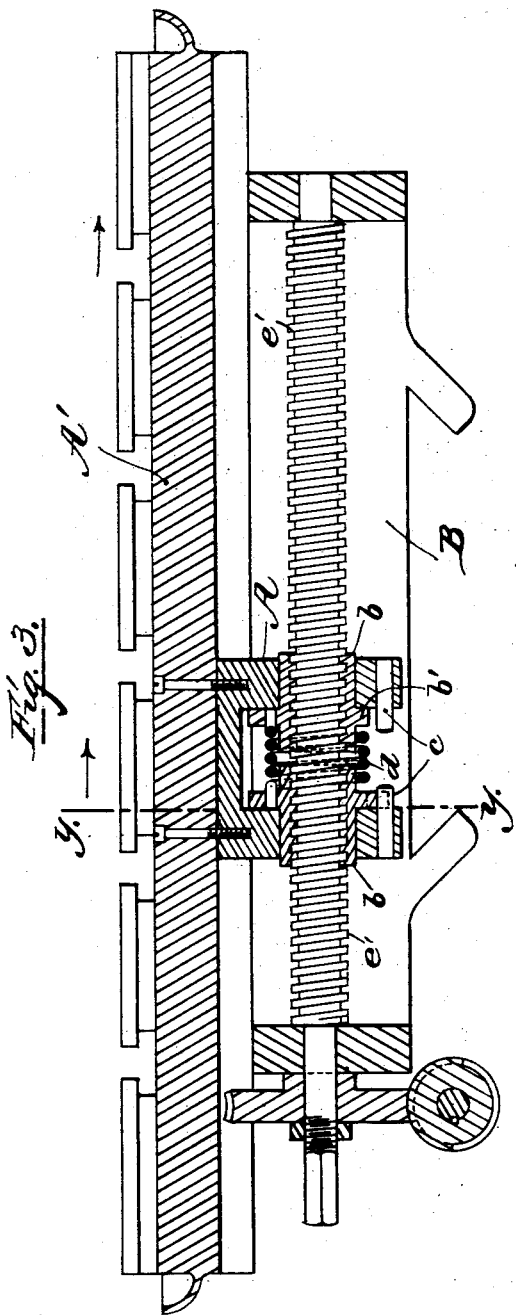
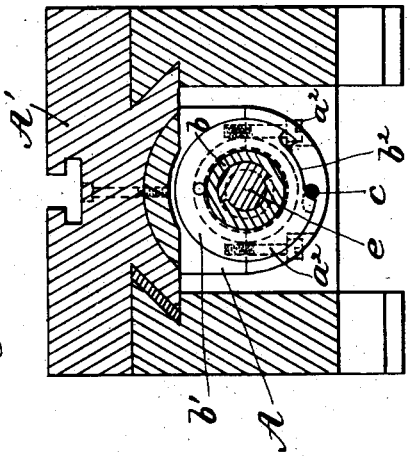
Witnesses:
S. J. Murphy.
John Branchard.
Inventor:
John H. Boynton
by Wilmarth H. Thurston
Atty.

UNITED STATES PATENT OFFICE.

JOHN W. BOYNTON, OF PHILADELPHIA, PENNSYLVANIA, ASSIGNOR TO THE BROWN & SHARPE MANUFACTURING COMPANY, OF PROVIDENCE, RHODE ISLAND.

MECHANISM FOR TAKING UP LOST MOTION.

SPECIFICATION forming part of Letters Patent No. 525,780, dated September 11, 1894.

Application filed January 30, 1894. Serial No. 498,446. (No model.)

*To all whom it may concern:*

Be it known that I, JOHN W. BOYNTON, formerly of the city and county of Providence, in the State of Rhode Island, but now residing at Philadelphia, in the State of Pennsylvania, have invented certain new and useful Improvements in Mechanism for Taking Up Lost Motion; and I do hereby declare the following specification, taken in connection with the accompanying drawings, forming a part of the same, to be a full, clear, and exact description thereof.

My invention relates to taking up lost motion in a screw and nut device, and while especially applicable for use in connection with a screw and nut feed, its use is not limited to such feeding device, but it may be employed in other connections and for other purposes, as for instance in instruments of precision where a nice and accurate adjustment is desired.

The primary object of the invention is to provide means for taking up lost motion in a screw and nut device.

A further object of the invention is to provide means for thus taking up lost motion in a screw and nut device, together with means for enabling the direction of revolution of the screw to be reversed, and such lost motion to be likewise taken up during the reverse movement of the screw.

A further object of the invention is to provide means whereby the movement of the screw in the reverse direction will automatically effect the changes required to enable the lost motion to be taken up during such reverse movement of said screw.

To these ends the invention consists primarily in the combination with a screw of two nuts engaging said screw, one of said nuts being held against turning, and the other nut being free to turn on said screw, and a torsion spring connected to said free nut and tending to turn the same upon said screw, and thereby take up any lost motion there may be.

The invention further consists in the combination with a screw of two nuts engaging said screw, each of said nuts being free to turn in its support, means for holding each of said nuts alternately against turning, and a torsion spring connected to each of said nuts, whereby when one of said nuts is held against turning, the other will be free to turn under the action of said torsion spring, and so that lost motion will be taken up no matter in which direction said screw be revolved.

The invention further consists in the combination with a screw of two nuts engaging said screw, each of said nuts being free to turn in its support, a torsion spring connected to each of said nuts, and means whereby when the direction of revolution of said screw is reversed, such reversal will automatically cause the proper one of said nuts to be held against turning and the other to be left free to turn under the action of said torsion spring.

As above stated, the invention hereinafter described is particularly applicable to a screw and nut feed, and in the accompanying drawings the invention is shown not only in a simple screw and nut device adapted to be used for any purpose where it is desirable that lost motion should be taken up, but also as applied to a screw and nut feed, such feeding device being shown in connection with a milling machine for feeding the work-supporting carriage, and in which it is particularly necessary that any lost motion should be taken up and back-lash prevented when the rotary cutter is revolved in the same direction that the carriage is fed.

Referring to the drawings, Figure 1 is a longitudinal section of a screw and nut device embodying my invention. Fig. 2 is a transverse section on the line $x, x$, Fig. 1. Fig. 3 is a longitudinal section of a portion of a milling machine and so much of the mechanism for feeding the same as will be necessary for an understanding of the present invention; and Fig. 4 is a transverse section on an enlarged scale on the line $y, y$, Fig. 3.

Referring first to Figs. 1 and 2, A is a suitable frame for supporting the parts, said frame being provided with two projecting arms or lugs $a, a,$ in each of which arms a nut $b$ is mounted so as to be free to turn therein. For convenience of assembling the parts each of the arms $a$ is cut in two, the removable top part $a'$ being secured to the fixed lower part by screws $a^2$, as shown in Fig. 2. Each of the nuts $b$ is provided with an annular flange $b'$, each of which flanges is cut away at a portion of its periphery so as to form an elongated recess $b$, as shown in Fig. 2. Projecting from each of the arms $a$, or from the removable top-portion $a'$ thereof, is a pin $c$, each of said pins being arranged to extend into the recess $b^2$ in the adjacent flange of the corresponding nut. A torsion spring $d$ connects the two nuts $b$, the ends of the wire composing said spring being bent and inserted in holes formed one in each of said nuts, as shown in Fig. 1. The screw $e$ extends through both nuts $b$ and is engaged by both of said nuts, said screw being provided with a suitable handle or crank $e'$ for turning the same.

With this construction and arrangement of parts, the torsion spring $d$ will tend to turn the two nuts $b$ in opposite directions, and thus if there be any play or lost motion between the threads of the screw and nuts, such lost motion will be taken up. If now the screw $e$ be turned in a direction to move said screw in the direction of the arrow, Fig. 1, the nuts $b$, being free to turn in their supports, will be carried around with the screw by reason of the friction between the threads of the screw and nuts until the end of the recess $b^2$ in the nut at the left hand end of said figure brings up against the pin $c$ arranged in recess, when said nut $b$ will be prevented from turning any farther, and will become and remain in effect a fixed nut as long as the screw is turned in the direction named. The other, or right hand, nut will, however, be left free to turn in its support and thus continue to take up any play or lost motion that there may be, said torsion spring tending to turn said right hand nut in a direction opposite to that in which the screw is turned.

When the screw is turned in the opposite direction, a reverse action of the nuts takes place, that is to say, both nuts will, by reason of the friction between said nuts and screw, be carried around with the screw in its reverse movement until the opposite end of the recess $b^2$ in the right hand nut brings up against its pin, when the further movement of said right hand nut will be arrested, and said nut will become for the time in effect fixed in its support, while the left hand nut will be left free to turn in its support under the action of the torsion spring and thus take up any play or lost motion during the reverse movement of the screw. It will thus be seen that not only is means provided for taking up lost motion during the movement of the screw in one direction, but also that the screw may be readily revolved in either direction, and lost motion be taken up in whichever direction said screw be revolved. It will further be seen that the simple reversal of the revolution of the screw from one direction to the other automatically effects the proper changes, and that no hand manipulation is required for such purpose.

Referring now to Figs. 3 and 4, in which the invention is shown as applied to the screw and nut feed of the work-supporting carriage of a milling machine, the nut-carrying frame A is secured to the under side of the work-supporting carriage A', said carriage being arranged to slide in ways on a second carriage B, which in turn is arranged to slide in ways on the frame of the machine in the usual manner. The screw $e'$, which is mounted in the carriage B, is to be revolved by any usual or suitable mechanism connected with the driving shaft of the machine. In this application of the invention the screw is held against endwise movement, and the nuts are moved lengthwise of the screw, thus giving motion to the work-supporting carriage A' to which said nuts are attached. This change, however, involves no change in the construction or relative arrangement of the parts or in the operation thereof. The means for taking up lost motion, for permitting the screw to be readily revolved in either direction, and for enabling the reversal of the direction of revolution of the screw to automatically effect the proper changes without hand manipulation, in the application of the invention as shown in Figs. 3 and 4, are the same as shown in Figs. 1 and 2 and as hereinbefore described, and such description will consequently not need to be repeated in this connection.

In order to enable the nuts to readily turn with the screw when the latter is reversed in its revolution, and thus effect automatically the changes above referred to, it is essential that the friction between the flanges $b'$ and the adjacent fixed arms of the supporting frame should be less than the friction between the nuts and screw. If it should be found in any case that the friction between said flanges and said arms is too great to permit the automatic shifting of the nuts, the difficulty may be readily remedied by the employment of suitable anti-friction devices between said flanges and arms.

If desired, instead of employing a single torsion spring connecting one of the nuts with the other, two separate torsion springs may be employed, one for each of said nuts, each of said springs being connected at one end to one of said nuts and being secured at the other end to a fixed support.

What I claim as my invention, and desire to secure by Letters Patent, is—

1. The combination, with a screw, of two nuts engaging said screw, one of said nuts being held against turning, and the other nut being free to turn on said screw, and a torsion spring connected to said free nut and tending to turn the same on said screw, substantially as described.

2. The combination, with a screw, of two nuts engaging said screw, each of said nuts being free to turn on said screw, a torsion spring connected to each of said nuts, and tending to turn the same on said screw, and means for holding one or the other of said nuts against turning, substantially as described.

3. The combination, with a suitable supporting frame, of a screw, two nuts mounted in said frame and engaging said screw, each of said nuts being free to turn in its support, a torsion spring connected to each of said nuts, and means for alternately holding each of said nuts against turning, substantially as described.

4. The combination, with a screw, of two nuts engaging said screw, each of said nuts being free to turn on said screw, a torsion spring connected to each of said nuts, and means whereby the reversal of the direction of revolution of said screw will serve to automatically hold each of said nuts alternately against turning, substantially as described.

5. The combination, with a suitable supporting frame, of a screw, two nuts mounted in said frame and engaging said screw, each of said nuts being free to turn in its support, and being each provided with a projecting flange having an elongated recess therein, fixed pins or projections, arranged one in each of said recesses, and a torsion spring connected to each of said nuts, whereby as said screw is revolved in one direction one of said nuts will be held against turning, while the other nut will be left free to turn on said screw under the action of said torsion spring, and whereby a reversal of the direction of revolution of said screw will automatically release the nut previously held against turning, and hold the other nut from turning, substantially as described.

6. The combination, with the work-supporting carriage of a milling or other machine, of two nuts connected to said carriage, each of said nuts being free to turn in its support, a screw engaging said nuts for feeding said carriage, a torsion spring connected to each of said nuts, and means for holding one or the other of said nuts against turning, substantially as described.

7. The combination, with the work-supporting carriage of a milling or other machine, of two nuts connected to said carriage, each of said nuts being free to turn in its support, a screw engaging said nuts for feeding said carriage, a torsion spring connected to each of said nuts, and means whereby the reversal of the direction of revolution of said screw will serve to automatically hold each of said nuts alternately against turning, substantially as described.

JOHN W. BOYNTON.

Witnesses:
ERNEST HOWARD HUNTER,
JAMES HOWLAND.